Sept. 27, 1932. J. J. SMITH 1,879,564
GREASE FITTING
Filed May 31, 1930
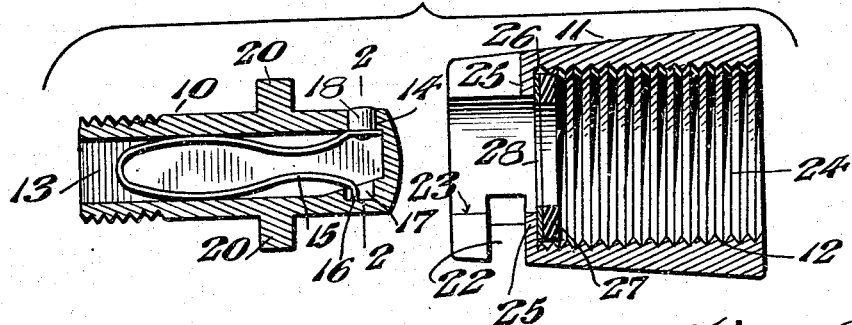
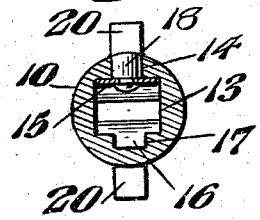
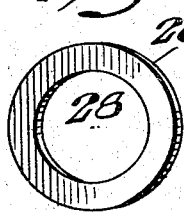
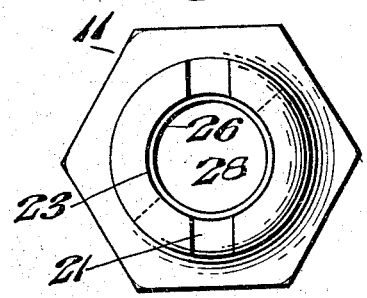
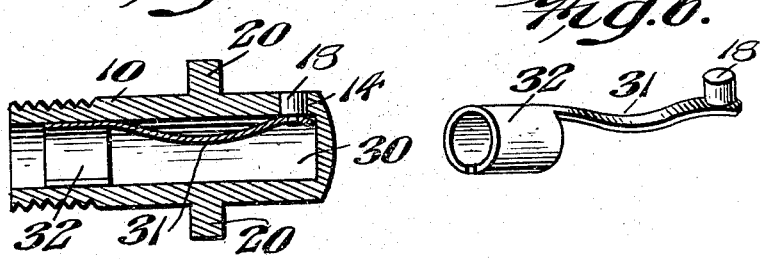
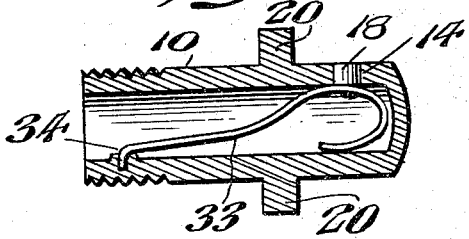
INVENTOR
James J. Smith,
BY
Robert M. Barr.
ATTORNEY Patented Sept. 27, 1932

1,879,564

UNITED STATES PATENT OFFICE

JAMES J. SMITH, OF PHILADELPHIA, PENNSYLVANIA, ASSIGNOR, BY MESNE ASSIGNMENTS, TO ENDURABLE PRODUCTS CO., INC., OF PHILADELPHIA, PENNSYLVANIA, A CORPORATION OF DELAWARE

GREASE FITTING

Application filed May 31, 1930. Serial No. 458,658.

The present invention relates to lubricating devices in general, but more especially to fittings for use with lubricant supply guns operating under relatively high pressures.

In fittings now in general use and as heretofore employed it has been the practice to permanently attach valve controlled inlet nipples to bearings so that any bearing requiring lubrication can receive the same by the attachment of a so-called gun supplying lubricant under pressure. The valves of these nipples are of the direct acting type employing a ball which is held seated over the valve inlet by a coil spring and these serve fairly effectively where light oils are concerned and introduced under relatively low pressures. Where, however, the lubricant is in the form of a grease which requires pressures running into thousands of pounds to expel the grease from the gun to the bearing this pressure not only forces the ball valve from its seat but jams it into the coils of the spring so that the latter is expanded to bite into the walls of the passage thereby entirely preventing passage of grease through the nipple and also holding the valve so that it can not again return to its seat. As a result fittings of this character are rendered useless and bearings are burnt out by failure of the grease to pass through the nipple.

Some of the objects of the present invention are to provide an improved valve controlled nipple and its cooperating chuck; to provide a nipple wherein supplied lubricant always passes through the nipple to the bearing regardless of the consistency of the grease and of the applied pressure; to provide a pressure gun chuck which coacts with the nipple in such a way as to prevent the collection of hardened grease about the inlet of the nipple and to remove dirt and collected sediment from the vicinity of the said inlet; to provide a fitting construction wherein the joint between a removable nipple and a chuck is effectively sealed against leakage of lubricant when the parts are connected together for operation; to provide a spring control for the valve of a lubricating nipple wherein the spring is always effective to maintain the inlet of the nipple closed when the latter is not connected to a supply gun; and to provide other improvements as will hereinafter appear.

In the accompanying drawing Fig. 1 represents a longitudinal section of a nipple and chuck in disconnected alined relation showing one form of the present invention; Fig. 2 represents a section on line 2—2 of Fig. 1; Fig. 3 represents a perspective of one form of wiping device for maintaining a lubricating nipple free from dirt and grease; Fig. 4 represents a detail in front elevation of the chuck; Fig. 5 represents a section of a nipple embodying another form of the invention; Fig. 6 represents a perspective of the spring employed with the form of invention shown in Fig. 5; and Fig. 7 represents a section of a nipple embodying another form of the invention.

Referring to the drawing and particularly to Fig. 1 a valve controlled inlet nipple pin 10 shown disconnected from but in alined relation with its cooperating chuck 11 which latter is of tubular form and internally threaded as shown at 12 for attachment to the discharge end of a grease gun of the pressure operated type. As here shown the nipple 10 has a longitudinally disposed passage 13 therein which is rectangular in cross section and is in communication with the inlet port 14 of the nipple at one end while its other end is open for communication with the passage leading to the bearing to be lubricated. This nipple differs from the ordinary type of nipple used in such lubricating systems in that the end which enters the chuck 11 is closed and the side inlet 14 serves as a means for admitting the grease to the passage 13.

In order to control the inlet 14 so that it is closed at all times when not connected to the chuck 11 a flat strip spring 15 of substantially elongated U shape is located in the passage 13 with one free end outwardly turned as shown at 16 to enter a recess 17 in the side of the nipple to thereby hold this free end of the spring against displacement. The opposite end of the spring extends across the inlet opening 14 and serves as a closure therefor, but in order to more effectively seal this inlet and to prevent the collection of dirt therein a plug 18 is attached to the spring 15 in alinement with the inlet 14 and is normally held in such inlet sealing it at all times by reason of the spring tension. As here shown the loop bending of the spring normally spaces the legs of the spring a greater distance apart than the width of the passage 13 and therefore when the spring is in place the legs of the spring are held outwardly pressed against two opposite sides of the passage 13 and serve as an additional means for anchoring the spring in its operative position. When the lubricant enters the inlet 14 under the applied pressure the plug 18 is forced back to fully open the inlet 14 and the lubricant then rides along the face of one leg of the spring to force it away from the wall of the nipple and thereby giving free passage for the lubricant to enter the channel leading to the bearing. Since the width of the spring is substantially the same as the width of the passage 13 there is no danger that the spring will move relative to the nipple and cause disalinement of the plug with the inlet port 14.

The end by which the nipple 10 is attached to a bearing is externally threaded for attachment of the part while intermediate its ends are two oppositely disposed lugs 20 which form parts of a bayonet joint as will be understood. The cooperating parts of the bayonet joint are the cross slot 21 in the end of the chuck 11 and circumferential grooves 22.

In bringing the nipple 10 to assembled relation with the chuck 11, the chuck 11 is moved over the closed end of the nipple 10 so that the latter passes snugly through the axial opening 23 of the chuck into the enlarged bore 24. The annular wall 25 encircling the opening 23 forms an abutment which seats a metallic wiper 26 and a packing ring 27, the last two elements being held in place by the cooperating end of the gun hose which is threaded into the bore 24. The wiper 26 is of annular form having a hole 28 of a diameter minutely greater than the outer diameter of the entering part of the nipple 10 so that it serves as an effective means for wiping and scraping any dirt away from the inlet port 14 to thereby ensure against dirt entering the bearing. The ring 27 is of a compressible type and serves to seal the joint between the parts and prevent leakage.

In the form of the invention shown in Fig. 5, a nipple 10 is shown wherein the body is like the form heretofore shown except it is provided with a lubricant passage 30 which is circular in cross section. In this modification a flat strip spring 31 is mounted upon a split cylinder 32 formed of spring material which is arranged to be compressed and inserted in the passage 30 where it expands, when released, to become a fixture with the spring 31 held firmly over the inlet port 14. The plug is secured to the spring 31 so that it enters the port 14 as a closure means.

The form of the invention shown in Fig. 7 differs from that of Fig. 5 in that a unitary hook-shaped flat spring 33 is used in the passage 30 and has one end anchored in a split lug 34 at one side of the nipple, while the bow or hook portion serves under, the compressed action, to hold the plug in place and to close the port 14.

Having thus described my invention, I claim:

1. As a new article of manufacture a lubricant nipple having an inlet port in the side thereof and a longitudinally disposed passage communicating with said port to form a discharge outlet from said nipple, a U-shaped spring compressed within said passage and abutting both sides thereof to close said inlet under non-operating conditions but yieldable under pressure to open said inlet and withdraw one side of said spring from contact with said passage to provide a discharge channel under operating conditions, and a plug secured to said spring to fit within said port.

2. As a new article of manufacture a lubricant nipple having an inlet port in the side thereof and a longitudinally disposed passage communicating with said port to form a discharge outlet from said nipple, and a flat strip spring held under compression in said passage to close said inlet under non-operating conditions but yieldable under pressure to bodily move away from one side of said passage to open said inlet under operating conditions.

3. As a new article of manufacture a lubricant nipple having an inlet port in the side thereof and a longitudinally disposed passage communicating with said port to form a discharge outlet from said nipple, said passage being square in cross section, and a flat strip spring fitting said passage and looped under compression to control said inlet port.

Signed at Philadelphia, county of Philadelphia, State of Pennsylvania, this 24th day of May, 1930.

JAMES J. SMITH.